United States Patent [19]

Brandon et al.

[11] 4,258,929

[45] Mar. 31, 1981

[54] VEHICLE SPRAY REDUCTION

[76] Inventors: Ronald E. Brandon, 1734 Lenox Rd., Schenectady, N.Y. 12308; James W. Winger, 5728 E. Glen Carla Dr., Huntington, W. Va. 25705

[21] Appl. No.: 31,024

[22] Filed: Apr. 18, 1979

[51] Int. Cl.³ .............................................. B62D 25/16
[52] U.S. Cl. .............................................. 280/154.5 R
[58] Field of Search ........ 280/152 R, 153 R, 154.5 R, 280/154.5 A

[56] References Cited

U.S. PATENT DOCUMENTS

| | | | |
|---|---|---|---|
| 2,699,955 | 1/1955 | Eaves et al. | 280/154.5 R |
| 3,027,178 | 3/1962 | Eaves | 280/154.5 R |
| 3,285,624 | 11/1966 | Aber et al. | 280/154.5 R |
| 3,869,617 | 3/1975 | Gaussoin et al. | 280/154.5 R X |
| 4,148,373 | 4/1979 | Cline | 280/154.5 R |

*Primary Examiner*—John J. Love
*Assistant Examiner*—Michael Mar

[57] ABSTRACT

Apparatus and methods are disclosed for reducing spray from wheeled vehicles operating on wet roadways. Reduction is achieved by decreasing lateral airflow by the use of slanted or curved mud flaps and the addition of a streamlined air deflector. Water droplets thrown by wheels are caught in grooved surfaces which prevent further atomization and dispersal.

2 Claims, 6 Drawing Figures

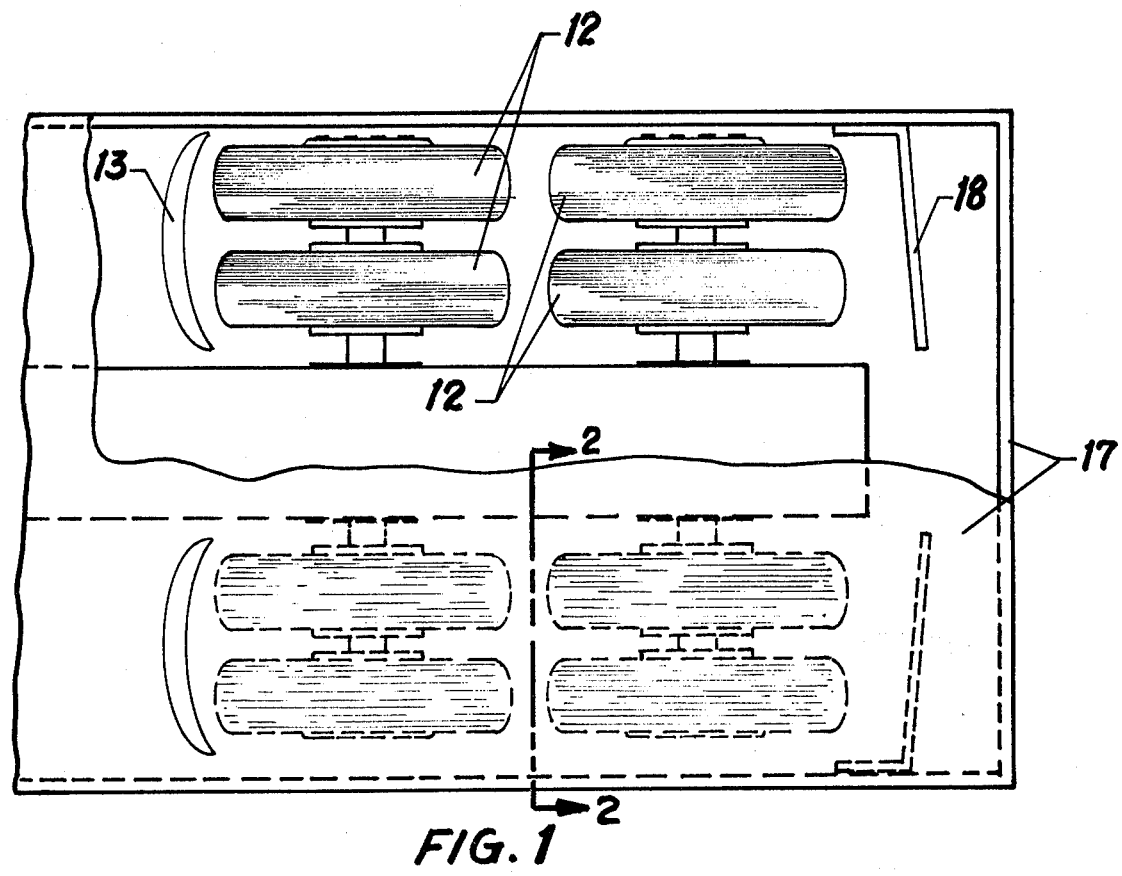
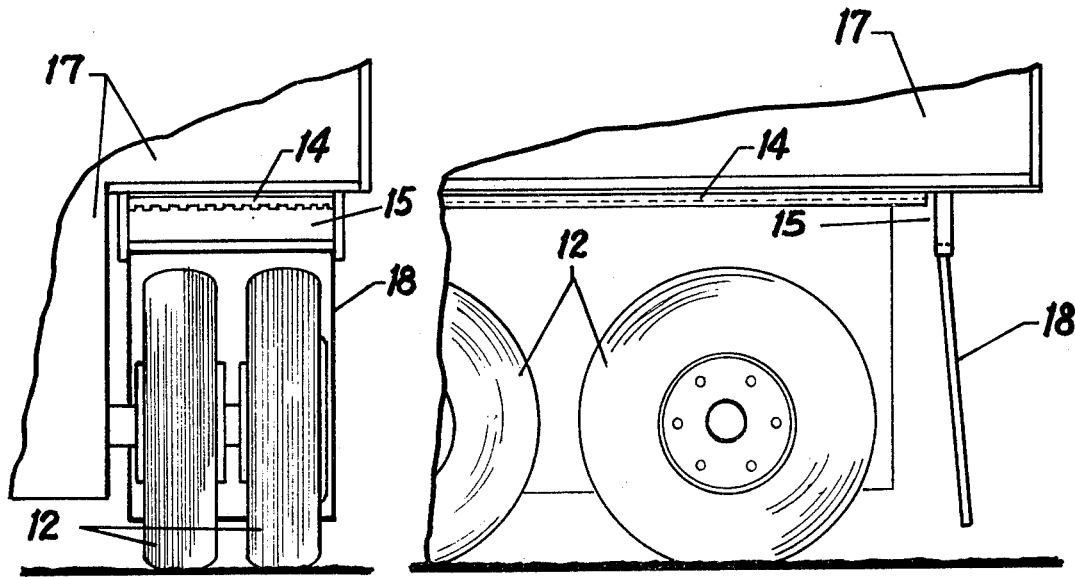

VEHICLE SPRAY REDUCTION

REFERENCES
CITED:        2831702   1958  Eaves and Robenchaud
              2844388   1958  Rheeling
              1759793   1930  Lund This invention relates to the art of preventing harmful and dangerous spray normally developed by truck and trailer wheels on wet roads.

High speed trucks, trailers, and other vehicles frequently employ wheels which are normally provided with mud flaps to minimize their tendency to throw spray, rocks, mud, etc. toward following vehicles. Unfortunately, due to a combination of complicated air flow and water droplet patterns, these vehicles produce a cloud of mist to both sides and to the rear when operating on wet roads that causes serious and dangerous visual obstruction to nearby vehicles, especially in passing situations.

The basic flow problem is that the motion of the truck itself produces a high relative velocity field sweeping toward the rear of the vehicle. This relative flow field rushes toward the wheels and mud flaps and is forced to both sides of these comparatively blunt objects. The flow is generally forced more to the outside of the vehicle due to the axle support mechanisms and trailer base beams that obstruct flow deflection to the inside of the wheel area. Thus it is seen that the wheel and mud flap area is a zone where sideways air currents occur. Dual wheels and multiaxles complicate this flow condition.

On wet roads, the wheels pick up and throw finely divided water droplets in a nearly full radial plane. These droplets impact against the underside of the vehicle and against the mud flaps where further atomization occurs and the turbulent air currents described above pick up the fine spray and disperse it to both sides as well as to the rear. In general, the smaller the water droplets are atomized, the more lasting and obstructing will be the clouds of spray that are created.

The foregoing undesirable aspects of current arrangements are advantageously overcome in accordance with the present invention.

In this respect the present invention in its broadest sense applies to wheeled vehicles operating on wet roads and provides a system that improves several aspects of water droplet size and dispersion. This is accomplished by employing one or more of the following devices.

A mud flap that is angled or curved to deflect the airstream and water droplets thrown by the wheels to the inside of the wheel area.

A specially grooved panel to capture water droplets thrown by wheels, prevent them from being atomized and dispersed as fine spray, and finally to duct such water to a relatively harmless place for discharge.

A specially grooved panel or surface for mud flaps to capture water droplets thrown by wheels, prevent them from being atomized and dispersed as fine spray, and finally to duct such water to a relatively harmless place for discharge.

A streamlined air deflector mounted in front of the wheels to reduce air flow entering the wheel area and lower the velocity, turbulence and dispersal of fine water droplets from the wheel area.

Accordingly, one purpose of this invention is to reduce or prevent the sideways and backward flowing spray cloud that issues from trucks and trailers when operating on wet roads.

A further object of this invention is to reduce the fine spray dispersion of water droplets and consequently reduce the size, longevity, and obscuring capability of the spray cloud issued by trucks and trailers.

Still another object of this invention is to reduce the portion of the spray that is deflected to the outside of trucks and trailers.

Yet a further object is the reduction of air velocity that enters the truck or trailer wheel area and contributes to the dispersal of water droplets as well as to further atomization of such droplets.

Another object of this invention is to collect portions of the water thrown by the truck or trailer wheels and discharge it in a location and manner to decrease the obscuring spray cloud.

Another object is the reduction of aerodynamic drag of current wheel and mudflap arrangements.

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawings, of which:

FIG. 1 is a plan view, partially in section, of a truck-type vehicle illustrating portions of the invention.

FIG. 2 is a fragmentary elevation view looking toward the rear of the vehicle.

FIG. 3 is a side view of the truck type vehicle with the water catcher and the mud flap mounted thereon.

Figure 4:
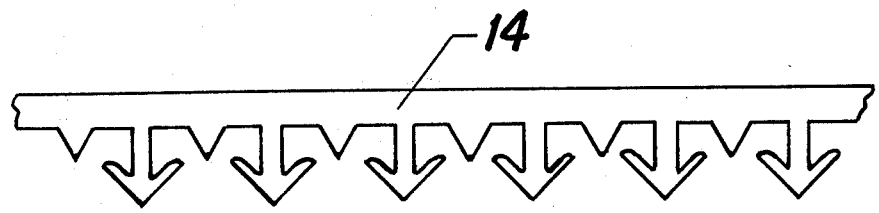
FIG. 4 is an enlarged fragmentary sectional view taken of the water catcher shown in FIG. 2.
Figure 5:
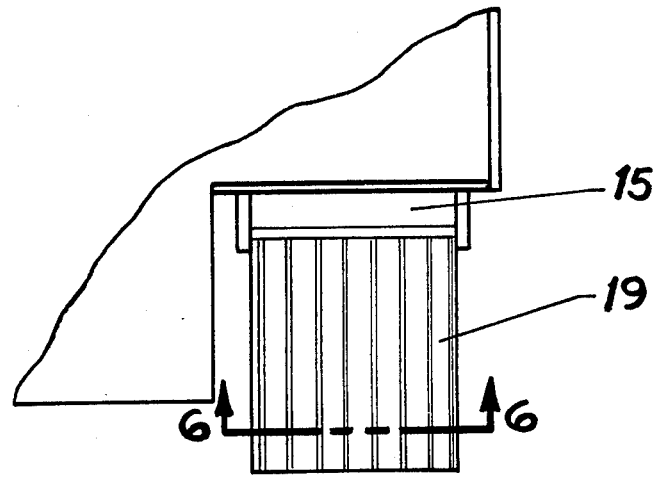
FIG. 5 is a front view of a mud flap employing water-catching surfaces.
Figure 6:
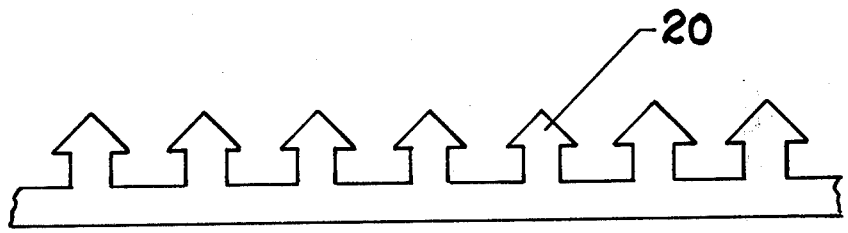
FIG. 6 is an enlarged fragmentary cross sectional view of the water catching surface taken substantially along line 11—11 of FIG. 4.

While the invention is illustrated with the dual rear wheels of a trailer, it is to be understood to be usable in other locations and with other types of vehicles.

Referring to the drawing in detail, there is illustrated a wheel area of a trailer. The mud flap 18 is shown angled to the flow of air and moisture droplets to encourage both to be deflected under the trailer body 17. A space 15 is shown open above the mud flap to prevent a high local air pressure from causing strong sidewise flow to the outside of the vehicle.

An air deflector 13 is shown mounted ahead of the wheels 12. The purpose of this device is to reduce the air flow sweeping into the wheel area which can atomize and carry water droplets with it as it is deflected to the sides by wheels and mud flaps. The deflector 13 should be streamlined to reduce aerodynamic drag and to minimize side currents generated by the deflector itself.

Mounted above the wheels are specially grooved water catchers 14. Water droplets thrown by the wheels are deflected toward the grooves which are protected from the sidewise currents of air to prevent atomization and dispersion. The water thus caught is not free to fall back into the wheel area but instead must flow along the grooves to the rear of the vehicle. The air flowing to the rear of the vehicle assists in moving the captured water through the opening 15 above the mud flap. The streams of water are discharged at this point in relatively large stable droplets.

The mud flaps 18 also see heavy impingement of water droplets thrown by the wheels. Such drops are normally atomized and carried to the side by currents of air. A further improved mud flap 19 can result from facing it with specially grooved water catching surface 20 that prevents the atomization and dispersion to the sides. The grooves hold the water so that turbulent cross-flowing air streams cannot carry it away as a spray cloud. The captured water is free to flow vertically downward, and is discharged in relatively large stable drops. The grooves can also be slanted to bias water flow to either side, thus decreasing water in the direct path of following wheels.

While what has been described is felt to be the preferred embodiment of the invention, other modifications will occur to those skilled in the art, and it is of course desired to cover in the appended claims all such modifications as fall within the true spirit and scope of the invention.

What we claim as new and desire to secure by Letters Patent of the United States is:

1. In a vehicle spray reduction system for wheeled vehicles operating on wet roadways, comprising a first member to be mounted in a horizontal position above the vehicle tires, said first member having on its undersurface a plurality of spaced, parallel, sharply pointed ridges and a plurality of parallel, vee shaped members which depend from the undersurface by thin, vertical webbs and located between said ridges, said ridges and vee shaped members being aligned with the vehicle whereby water spray from the vehicle tires is deflected by said ridges into troughs formed by said vee shaped members, the water thus captured is protected from dispension by sideways air currents and is drained at the rear end of said trough, and a second member, having a relatively flat configuration, to be mounted in a vertical manner behind said tires to deflect any rearward spray.

2. The vehicle spray reduction system of claim 1 wherein said second member has a plurality of parallel, vee shaped deflectors which are vertically aligned on the inside surface of said member, said vee shaped deflectors forming troughs which protects the captured water droplets from dispension by sideways air currents while permitting the water to drain downwards.

* * * * *